Sept. 22, 1931.  L. BREGUET  1,824,325

PROPELLING SYSTEM FOR AIRCRAFT

Filed Dec. 16, 1929  4 Sheets-Sheet 1

Applicant:-
Louis Breguet
By Mauro & Feuro
Attorneys

Sept. 22, 1931.   L. BREGUET   1,824,325

PROPELLING SYSTEM FOR AIRCRAFT

Filed Dec. 16, 1929   4 Sheets-Sheet 3

Applicant:
Louis Breguet
By Mauro & Lewis
Attorneys

Sept. 22, 1931.  L. BREGUET  1,824,325
PROPELLING SYSTEM FOR AIRCRAFT
Filed Dec. 16, 1929    4 Sheets-Sheet 4

Patented Sept. 22, 1931

1,824,325

UNITED STATES PATENT OFFICE

LOUIS BREGUET, OF PARIS, FRANCE, ASSIGNOR TO SOCIETE ANONYME DES ATELIERS D'AVIATION LOUIS BREGUET, OF PARIS, FRANCE, A COMPANY OF FRANCE

PROPELLING SYSTEM FOR AIRCRAFT

Application filed December 16, 1929, Serial No. 414,464, and in France December 22, 1928.

The present invention has for object the arrangement in an aeroplane of a motor propelling system which comprises essentially a motor lodged in the wing or in an accessible cock-pit and fitted to the wing or to one of the fuselages or shells, the position of said motor being determined by the conditions of centering of the aeroplane, and a propeller placed above the wing and to the rear of the leading edge thereof, the transmission between the motor and the propeller being assured by a horizontal shaft prolonging the driving arbor and by a single bevelled gearing or other analogous mechanism.

This arrangement allows in particular the attention, upkeep and repair of the motor while flying and enhances the aerodynamic output both of the wing whose leading edge works virgin air and the propeller which pushes back the air in a zone freed of obstacles, this disposition placing the propeller under shelter of the sprays in the case where the aeroplane is endowed with nautical properties and susceptible in particular, of navigating the surface of the water.

The description which follows taken with the accompanying drawings by way of example will enable the manner in which the invention is carried out to be well understood.

In the drawings:—

Figure 1:
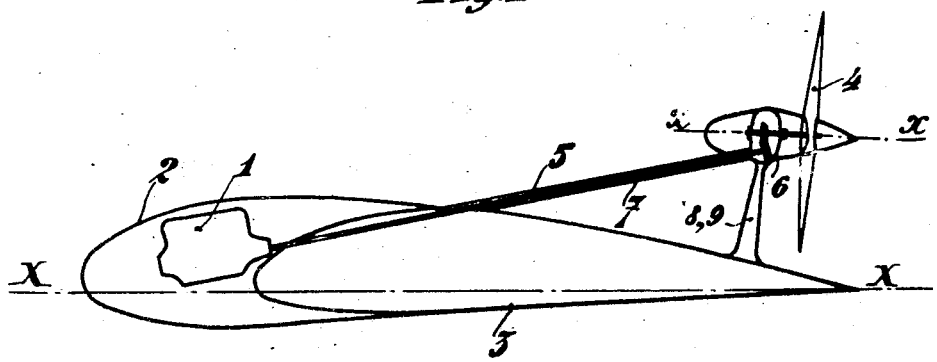
Figure 1 is an elevational diagram illustrating the principle of my invention.

Referring to the drawings more in detail, the motor 1, or a group of motors, in the case of motors coupled to the same arbor, is disposed in a place necessitated by the conditions of centering at the level of one of the wings 3, and is inclined to the horizontal at a rather small angle in order that the transmission shaft 5, which directly prolongs the motor shaft, can through the medium of a single bevel gearing or transmission 6, actuate a propeller, working above the wing 3 and to the rear of the leading edge thereof, the axis $x$—$x$ of said propeller being inclined with respect to the line $x$—$x$ of flight in such wise that the wind of the propeller suitably harmonizes with the normal current of air on the intrados of the wing.

Figure 2:
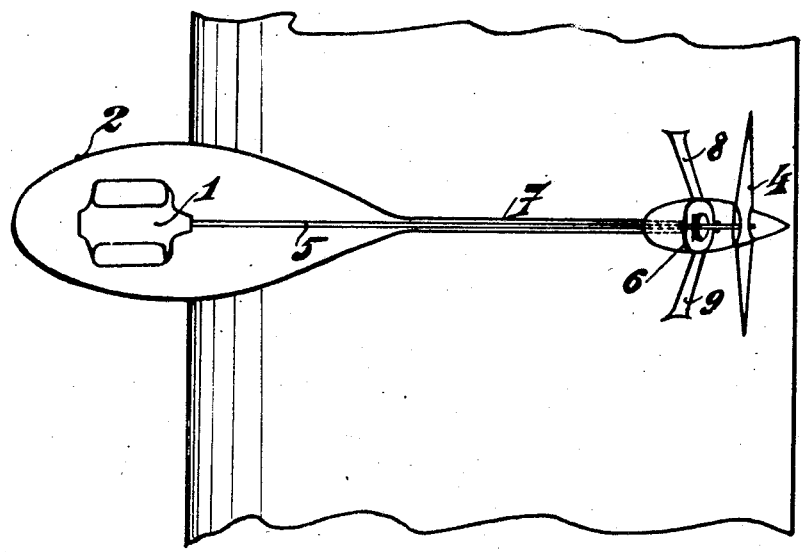
Figure 2 is a similar view in plan.

As shown in Figs. 1 and 2, the motor 1 can be lodged in a streamline nacelle 2, which is situated in line or out of alignment with the bodies, fuselages or sheals of the aeroplane and is attached to the surface of the wing 3 and eventually to the adjacent body in a way to render as small as possible the perturbation of the normal current of air about the wing, the said nacelle 2 being, moreover provided with an access easily attained by the personnel on board and presenting as much as possible sufficient dimensions to allow a mechanician to effect all operations of attention, upkeep, or repairs deemed useful on the motor 1 while flying.

Figure 3:
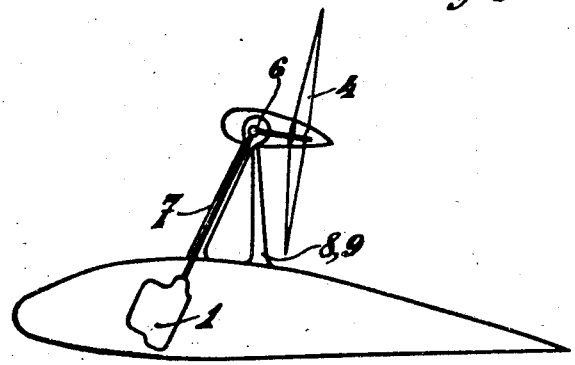
Figures 3, 4, 5 and 6 are elevational views of a number of embodiments of my invention.

But when the wing is sufficiently thick, I prefer to place the motor in a chamber furnished in the said wing, as is illustrated by way of example in Figure 3.

The transmission bevel gearing 6 and the propeller shaft driven thereby and whose length is as short as possible, are supported by a post. In the particularly advantageous disposition illustrated in Figures 1, 2 and 3, said post is a tripod of which one of the feet is formed by the transmission arbor itself or by a streamline casing 7 surrounding the said arbor and of which the two other feet are formed of two streamline masts 8 and 9 bearing on the back of the wing and, in principle, symmetric with respect to a plane parallel to the longitudinal plane of symmetry of the aeroplane. Said two masts can moreover be replaced by a single mast sufficiently strong thus reducing the post to a support having two feet.

Various accessory dispositions are likewise provided for improving the installation of the motor propeller group whose principle has just been described.

The transmission mechanism 6 can play the part of a speed changer between the motor and the propeller, the said mechanism being able, if it is formed by a bevelled gear and lateral crowns, to then have two crowns with different spaced teeth, which dispenses chiefly with utilizing a speed reducer mounted on the motor itself, at the end of the transmission arbor 5.

There may be provided, at any point in the transmission between the motor 1 and the propeller 4, a clutch device for breaking the connection between the motor and the propeller.

The propeller 4 can be of variable pitch and this variability is utilized chiefly for causing braking in the air during landing and combined or not with the separating of the propeller arbor in a specially chosen position for eclipsing the blades of the propeller in the direction of the wind when the motor has stopped.

For diminishing the inclination or the length of the transmission arbor 5 or for favorizing the accessibility to the motor 1, it can be particularly advantageous to adopt in the motor the so-called inverse disposition in which the crank shaft is in the upper part of the motor, when the distribution of the cylinders is not symmetrical with respect to the crank shaft.

It is obvious that the embodiment and assembly of the transmission arbor can be conceived in a way to utilize all mechanical means allowing to reduce or eliminate vibrations from flexion or torsion of the said arbor. In particular, it is obvious that the dispositions must be chosen to eliminate, when the aeroplane operates, the elastic deformation of the framework of the wing, of the motor frame, and of the post supporting the transmission idler and so that it does not introduce excessive stresses in the transmission system or perturbations in its operation.

Figure 4:
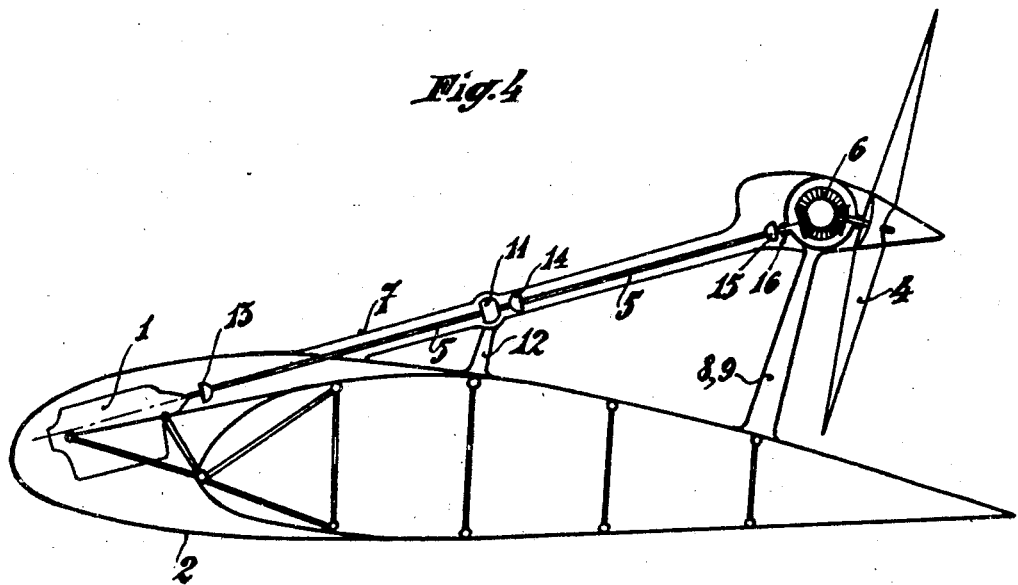
Figure 5:
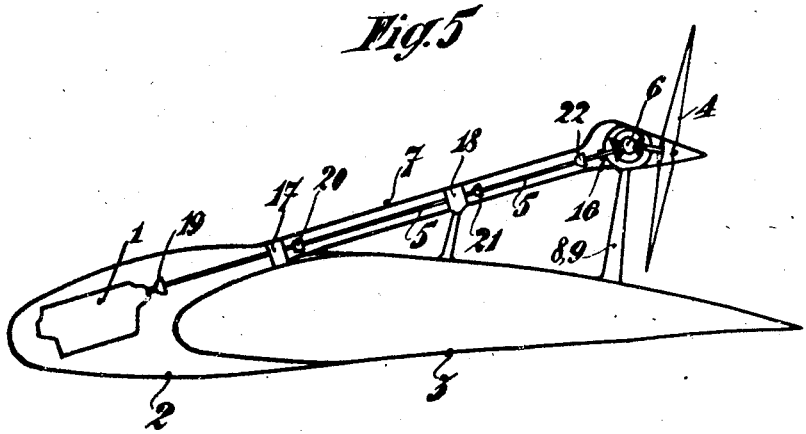

By way of example, Figs. 4 and 5 indicate two devices which could be adopted in the case where the length of the transmission arbor would necessitate one or two intermediate supports.

In the example illustrated in Fig. 4, the arbor 5, divided in two sections, is supported by the intermediate socket bearing 11 connected to the framework of the wing by the support 12.

The two sections of arbor 5 are connected together by a Cardan joint 14 and respectively by the Cardan joints 13 and 15, at one end to the motor arbor and at the other end to the first arbor of the transmission device 6, the said arbor being very short and carried by a stop bearing 16.

In the example illustrated in Fig. 5, the disposition is very analogous to that of the preceding example but the transmission arbor 5 is supported by two intermediate bearings of the socket type 17 and 18, instead of one only, connected by supports or beams to the framework of the wing. The transmission arbor 5 is divided into three parts, instead of two, assembled together and at the extremities of the system to the first shaft of the gearing mechanism 6 and to the motor shaft by four Cardan joints 19, 20, 21, 22.

In the two examples illustrated in Figures 3 and 4 it is obvious that the devices can be provided for allowing a certain variability of the length of the transmission between the motor 1 and the gearing mechanism 6 according to possible deformations of the whole. As devices of this nature I could use chiefly flexible Cardan joints or the sliding of one part of the transmission arbor thereon.

Figure 6:
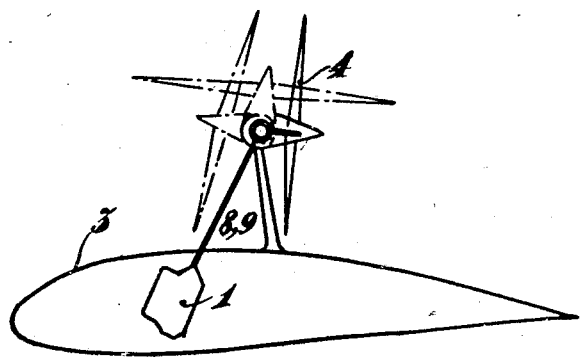

Finally in the case where the motor and its arbor are strongly inclined, that is rather near the vertical, the use of a transmission gearing mechanism with lateral crowns allows rendering the orientation of the propeller shaft variable, said variation, combined or not with the use of a propeller having a variable pitch, being able to allow rendering the plane of the propeller substantially horizontal for causing the propeller to act as a sustainer and even bring the propeller arbor nearly 180° from its original position and thus reverse the direction of its force axially in a way to utilize the propeller as a braking means on the air at the time of descending or landing. This disposition is represented diagrammatically in Figure 6, in which the normal position of the propeller can be according to the circumstances either in a position in front of the supporting post of the transmission, which position is illustrated in dot and dash lines in Figure 6, or in a position behind the said post, which position is illustrated in full lines in the same figure.

Figure 7:
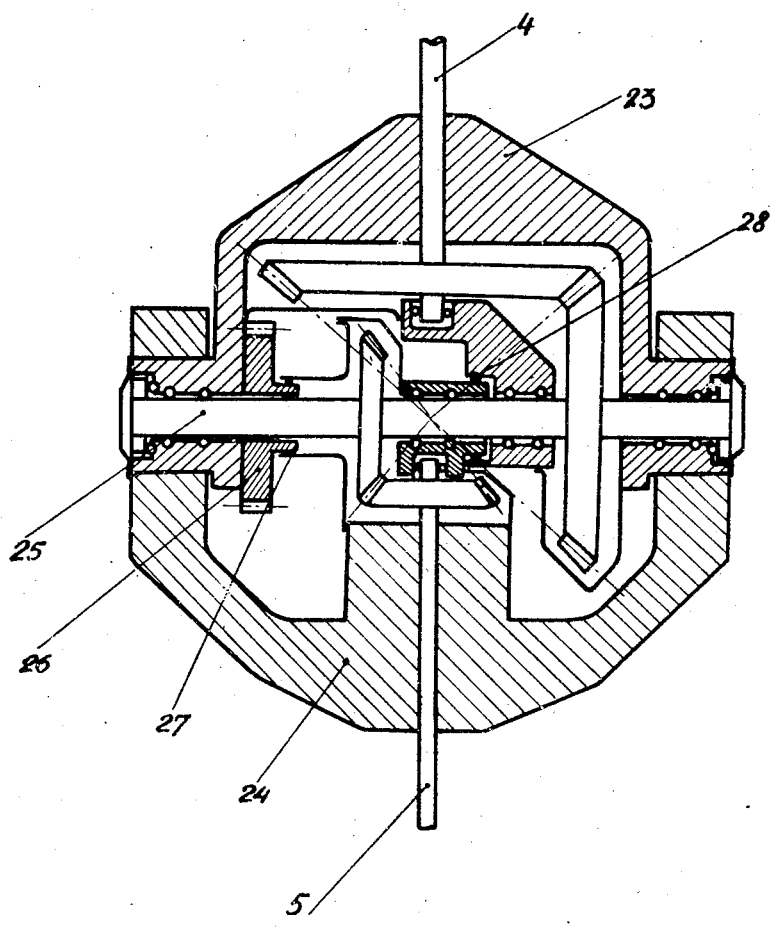
Figure 7 is a sectional detail of Figure 6.

By way of example, Figure 7 indicates how such a device for changing the inclination of the propeller arbor is carried out.

According to the disposition illustrated in this figure which superposes half transverse sections passing through the transmission arbor 5 and the propeller carrying arbor 4, the said arbors are supported respectively by forks 23 and 24 which are pivoted one on the other about the axis of the intermediary arbor 25 of the lateral crowns serving as a transmission gearing mechanism which forms a speed reducer. The support 23 of the propeller carrying arbor has fixed thereon a spur gear 26 which is adapted to be actuated from a distance by means of an irreversible transmission gear, thus allowing modification in the orientation of the propeller carrying arbor without the reaction of said propeller being transmitted by said transmission gear. The arms of the post supporting the transmission gearing mechanism illustrated are rigid with the fork 24 and it will be conceived that under these conditions, the said arms being sufficiently close to the vertical, I can easily modify through 180° nearly the orientation of the propeller arbor. As is illustrated diagrammatically, for assuring tightness of the casing respectively surrounding the pinions and crowns with relation to the shafts 4 and 5, the said casings are connected together by annular joints 27 and 28 such as piston rings.

Having thus described my invention what I claim as new and desire to secure by Letters Patent is:—

1. A motor propelling device for aeroplanes comprising a streamline structure, a motor disposed in said structure, a propeller supported above the main supporting surface of the aeroplane and to the rear of the leading edge thereof, a prolonged motor drive shaft inclined from front to rear in a longitudinal plane with respect to the aeroplane and projecting through the upper face of said streamline structure, and motion transmitting means interconnecting said prolonged motor drive shaft and said propeller.

2. A motor propelling device for aeroplanes having a main supporting surface, a motor disposed in said main supporting surface, a propeller supported above said main supporting surface and to the rear of the leading edge thereof, a prolonged motor drive shaft, inclined from front to rear in a longitudinal plane with respect to the aeroplane and projecting through the upper face of said main supporting surface, and motion transmitting means interconnecting said prolonged motor drive shaft and said propeller.

3. A motor propelling device for aeroplanes having a main supporting surface, a motor disposed in said main supporting surface, a tripod disposed on the upper surface of said main supporting surface to the rear of the leading edge thereof, a propeller on said tripod, a prolonged motor drive shaft disposed in one of the legs of said tripod, and motion transmitting means interconnecting said prolonged motor drive shaft and said propeller.

4. A motor propelling device for aeroplanes having a main supporting surface, a motor disposed in said main supporting surface, a supporting post mounted on the upper surface of said main supporting surface, a propeller journalled in said supporting post, a prolonged motor drive shaft journalled in said post, a tubular strut surrounding said prolonged motor drive shaft adapted to act as a stay for said post, and motion transmitting means interconnecting said prolonged motor drive shaft and said propeller.

5. A motor propelling device for aeroplanes having a main supporting surface, a motor disposed in said main supporting surface and to the rear of the leading edge thereof, a prolonged motor drive shaft having a plurality of sections prolonging said motor shaft, Cardan joints interconnecting said sections, a propeller supported above said main supporting surface and to the rear of the leading edge thereof, motion transmitting means connected to said propeller, and a Cardan joint interconnecting said motion transmitting means and said prolonged motor drive shaft.

6. A motor propelling device for aeroplanes having a main supporting surface, a motor disposed in said main supporting surface, a propeller supported above said sustaining plane and to the rear of the leading edge thereof, a prolonged motor drive shaft inclined from front to rear and projecting through the upper face of said main supporting surface, motion transmitting means interconnecting said prolonged motor drive shaft and said propeller, and means for swinging said propeller through substantially 180° of arc cooperating with said transmission means.

7. A shifting device for aeroplane propellers comprising a casing for receiving a propeller shaft, a bevelled gear on the extremity of said shaft within said casing, a lay shaft within said casing, a bevelled gear on said lay shaft meshing with said first mentioned bevelled gear, said lay shaft being disposed at right angles to said propeller shaft, a second bevelled gear on said lay shaft, a complementary casing adapted to pivotally receive said first casing and to receive a driving shaft, a bevelled gear on the extremity of said driving shaft in said casing last named, and means for swinging said first mentioned casing about said lay shaft.

8. A shifting device for aeroplane propellers comprising a casing for receiving a propeller shaft, a bevelled gear on the extremity of said shaft within said casing, a lay shaft within said casing, a bevelled gear on said lay shaft meshing with said first mentioned bevelled gear, said lay shaft being disposed at right angles to said propeller shaft, a second bevelled gear on said lay shaft, a complementary casing adapted to pivotally receive said first casing and to receive a driving shaft, a bevelled gear on the extremity of said driving shaft in said casing last named, means for swinging said first mentioned casing about said lay shaft, and means for rendering said casings tight with respect to each other.

9. A motor propelling device for aeroplanes comprising a streamline structure integral with said aeroplane, a motor disposed in said structure, a propeller supported above said structure and to the rear of said motor, a prolonged motor drive shaft making an angle with the axis of the propeller disposed in a longitudinal plane with respect to the aeroplane and projecting through the upper face of said structure, and motion transmitting means interconnecting said prolonged motor drive shaft and said propeller.

10. A motor propelling device for aeroplanes comprising a streamline structure, a motor disposed in said structure, a propeller disposed above the main supporting surface of the aeroplane and to the rear of the leading edge thereof, a prolonged motor drive shaft inclined from front to rear with respect to the axis of the propeller disposed in a longitudinal plane with respect to the aeroplane and projecting through the upper face of said streamline structure, and motion transmitting means interconnecting said prolonged motor drive shaft and said propeller.

11. A motor propelling device for aeroplanes having a main supporting surface which comprises a motor, a streamline structure for enclosing said motor, a propeller supported above the main supporting surface of the aeroplane and to the rear of the leading edge thereof, a prolonged motor drive shaft inclined from front to rear with respect to the axis of the propeller disposed in a longitudinal plane with respect to the aeroplane and projecting through the upper face of said streamline structure, and motion transmitting means interconnecting said prolonged motor drive shaft and said propeller.

12. A motor propelling device for aeroplanes comprising a main supporting surface, a motor disposed in said main supporting surface, a propeller supported above said main supporting surface and to the rear of the leading edge thereof, a prolonged motor drive shaft inclined from front to rear with respect to the axis of the propeller disposed in a longitudinal plane with respect to the aeroplane and projecting through the upper face of said main supporting plane, and motion transmitting means for interconnecting said prolonged motor drive shaft and said propeller.

13. A motor propelling device for aeroplanes having a main supporting surface, a motor disposed in said main supporting surface, a supporting bracket having the form of an inverted V symmetrically disposed with respect to a vertical plane on the upper face of the main supporting surface to the rear of the leading edge thereof, a propeller carried by said bracket, a prolonged motor drive shaft inclined from front to rear with respect to the axis of the propeller journalled in said bracket, and motion transmitting means interconnecting said prolonged motor drive shaft with said propeller.

14. A motor propelling device for aeroplanes having a main supporting surface, a motor disposed in said main supporting surface, a propeller supported above said main supporting surface and to the rear of the leading edge thereof, a prolonged motor drive shaft inclined from front to rear with respect to the axis of the propeller projecting through the upper face of said main supporting surface, a bevel surface acting as a speed reducer for interconnecting said prolonged motor drive shaft and said propeller.

In testimony whereof I have signed this specification.

LOUIS BREGUET.